United States Patent Office 3,439,029
Patented Apr. 15, 1969

3,439,029
PROCESS FOR THE PRODUCTION OF ACETIC ACID BY CATALYTIC GAS-PHASE OXIDATION OF n-BUTENES
Rudolf Brockhaus, Marl, Germany, assignor to Chemische Werke Huls A.G., Marl, Germany
No Drawing. Filed May 19, 1966, Ser. No. 551,236
Claims priority, application Germany, May 19, 1965, C 35,887
Int. Cl. C07c 51/32
U.S. Cl. 260—533                    11 Claims

ABSTRACT OF THE DISCLOSURE

Acetic acid is produced by the gas phase oxidation of butene in the presence of an antimony vanadate catalyst.

This invention relates in general to the production of acetic acid and, more particularly, to the use of a new catalyst in the production thereof.

Various processes have been employed heretofore to produce acetic acid by the oxidation of unsaturated hydrocarbons, such as acetylene, ethylene, or saturated low-boiling hydrocarbons, such as butane or hexane. When unsaturated hydrocarbons having more than 2 carbon atoms are oxidized in the liquid phase and in the presence of noble metal catalysts, the product contains predominantly ketones, whereas oxidation in the absence of catalysts and at higher reaction temperatures results in a mixture of several reaction products, such as acids, glycols, and the esters thereof. Several of these products, however, tend to resinify under the prevailing reaction conditions; consequently, poor yields of usable products are obtained.

With the increase in refining of oil to meet the growing demand for gasoline, correspondingly greater amounts of valuable by-products, such as $C_4$-hydrocarbons are produced.

In the oxidative conversion of these $C_4$-hydrocarbons into valuable products, there is disclosed in DAS 1,177,628 the use of an antimony vanadate catalyst prepared by mixing, if desired in the presence of a carrier, a vanadium component and a phosphorus component, whereupon antimony chloride is added, and the entire mixture is concentrated by evaporation, dried, and heat treated at 400 to 600° C. When the thus produced antimony vanadate catalyst is employed in the gas phase oxidation of a mixture of isobutylene and n-butene to produce methacrolein, there is little or no oxidation of the n-butenes to acetic acid (DAS German published application 1,181,194). Moreover, comparative tests conducted according to the example in DAS 1,181,194 using in the oxidation process an unsaturated hydrocarbon containing about 10 percent butene-1, resulted in the oxidative conversion of no more than 10 percent of the butene-1 present, there being obtained about equal parts of acetic acid and acetaldehyde (about 20% of the butene-1 are dehydrogenated to butadiene). It is, therefore desirable, to provide a process to obtain high yields of acetic acid by the catalytic oxidation of n-butenes.

It is, therefore, a principal object of this invention to provide an improved catalytic oxidation process for the production of acetic acid from n-butenes.

It is another object of the invention to provide an improved oxidation catalyst for use in this process.

These and other objects and advantages will become apparent by reference to the following description and claims appended hereto.

It was surprisingly discovered that acetic acid can be produced in high yields by the gas-phase oxidation of n-butenes with oxygen or oxygen-containing gases, if desired, in the presence of steam, by conducting the reaction at 250–400° C. in the presence of an antimony vanadate catalyst produced by precipitation as hereinafter described.

Unlike the process of German published application 1,181,194 in which the gas-phase oxidation of hydrocarbons comprising isobutylene and n-butenes in the presence of an antimony vanadate catalyst results in only about a 0.5% conversion of the n-butenes to acid, the process of the present invention carried out with similar hydrocarbons, and an antimony vanadate catalyst produced by precipitation surprisingly results in a 50 to 90% conversion of n-butenes to acetic acid. Satisfactory yields of acetic acid are obtained with isobutylene and n-butenes such as cis- and trans-n-butene-(2), n-butene-(1) and mixtures thereof.

In the oxidation of n-butenes, the hydrocarbon chain is cleaved and a terminal carbon atom is oxidized to form an acid. In the present process, there is realized a 50 to 90% conversion of butenes to acetic acid, some propionic acid and malic acid being formed (maximally 15% of the total amount of acid). With the catalysts of this invention, the oxidation of both isobutene and n-butenes results in favorable yields of acetic acid.

In these reactions, formic acid is initially formed, but due to its unstable nature under the reaction conditions it decomposes to carbon dioxide and water. Thus, the reaction product contains little, if any, formic acid, this being advantageous especially during the working-up process of the reaction products, since formic acid is highly corrosive. In addition to these by-products, minute quantities of about 1% (based on acetic acid) of carbonyl compounds, mostly in the form of formaldehyde, are also produced.

In the antimony vanadate catalysts employed herein the atomic ratio of antimony to vanadium is desirably 1:3 to 2:1, preferably 0.9:1 to 1:1.5.

The antimnoy vanadate catalysts employed in the process of the present invention are prepared by precipitation methods. A suitable precipitation method is carried out, for example, by combining an aqueous solution of an antimony salt, such as antimony trichloride, with an aqueous solution of aminovanadate, such as $H_3VO_4(C_2H_5NH_3)_3$ in a continuous manner and in stoichiometric or almost stoichiometric amounts. Upon combining these solutions (except when operating in extreme dilution), a precipitate is obtained which is then separated from the mother liquor, washed, dried at 50–200° C., preferably at about 170° C., and calcined at 300–700° C., preferably between 480 and 520° C.

Alternatively, the catalyst can be formed from a solution of vanadium pentoxide and antimony trichloride in a strong acid solution, such as hydrochloric acid. In this case, formation and precipitation of the antimony vanadate is achieved by neutralizing the solution with a volatile base, preferably ammonia. In the precipitation from a hydrochloric acid solution, the vanadium$^V$ and the antimony$^{III}$ ions reduce and oxidize one another, and the solution assumes a blue color (indicating the presence of vanadium$^{IV}$). Under these conditions, there is obtained a catalyst of antimony vanadate wherein the vanadate is present in its several valence states. The resulting precipitate is then removed from the mother liquor, washed, and dried as described above. Other methods as described in Examples 1 and 2 exemplify the preparation of the catalyst.

Without being bound by an explanation of the properties of the catalyst responsible for the unexpectedly high activity thereof, it is believed that the method of preparing the catalyst by formation and precipitation from an aqueous solution is of importance. Broadly, the catalyst is prepared by dissolving a compound of vanadium and oxygen, in a neutral or acidic aqueous solution containing antimony ions, wherein one of said metals has a valence of 5 and the other a valence of 3, and reacting aqueous solution containing antimony ions, and reacting said antimony ions with said vanadate ions at a substantially neutral or alkaline pH to form a precipitate. In one method of precipitation the vanadium and antimony are present as halogen compounds in a strong hydrochloric acid solution. By adding an aqueous ammonium solution thereto, these halogen compounds are hydrolyzed, and antimony vanadate or a mixed oxide of another valence stage (for example vanadium antimonate) are precipitated.

The specific surface of such catalysts ranges between 10 and 15 m.$^2$/g.

In contrast to the effect of using the antimony vanadate catalyst of DAS 1,181,194 in the gas phase oxidation of isobutylene, wherein there are produced substantial amounts of carbonyl compounds, utilization of the antimony vanadate catalyst preduced by precipitation produces only about 1% carbonyl compounds, and relatively high yields of acetic acid.

The antimony vanadate catalyst can be used in the form of free particles or deposited on a suitable carrier. In the latter case, the catalyst can be conveniently deposited by carrying out the precipitation in the presence of a carrier; but the catalyst can also be combined with the carrier after the precipitate has been washed. Suitable carriers for the catalyst are silicic acid, pumice, kieselguhr, alumina.

The catalyst composition can contain up to 40% of an inert carrier, particularly satisfactory conversion being obtained with an antimony vanadate catalyst containing about 25% of Aerosil®. In general, the weight ratio of the carrier to the active catalyst can be varied between 0:1 and 1:1.

The catalyst, whether it is in particle form or deposited on a carrier, is desirably heat-treated at temperatures of 250 to 650° C., preferably at about 500° C., before it is used. This heat treatment is conducted in the presence of air.

In the acetic acid synthesis according to the invention, it is desirable to employ a molar ratio of n-butene to oxygen ranging between 1:1 and 1:20, preferably ranging between 1:2 and 1:5. In the event air is used as a source of oxygen, the molar ratio of n-butenes to air can range from 1:100 to 1:2, preferably 1:10 to 1:40.

Although the oxidation agent can be pure molecular oxygen, other inert carriers can be used therewith, such as nitrogen, carbon dioxide, lower paraffins containing 1 to 5 carbon atoms, and steam. When diluted mixtures are used, the oxygen content is desirably between 2 and 90%, preferably between 10 and 20% by volume of the oxidation agent. Moreover, it has been found that the selectivity of the catalyst for the n-butenes is increased when steam is utilized in the reaction. It is particularly advantageous to use as an oxidation agent air and steam. In such a case, a particularly desirable reaction mixture comprises butene-(2)-air and steam in a volume ratio of 1:15:5 to 1:15:15.

The catalyst prepared in the above-described manner can be employed in a reactor suitable for the gas-phase reaction according to the present invention.

The oxidation reaction is preferably conducted in a reactor with a fluidized catalyst bed, but fixed catalyst bed reactors can also be used. Although satisfactory yields of acetic acid are obtained with only one pass of the reactants through the catalyst bed, even higher yields can be realized when the reaction is conducted at pressures of 1 to 6 atmospheres and the unreacted gases are recycled to the reactor. Preferably, the molar ratio of recycled gas to feed stock (recycle ratio) is between 10 and 1 more preferably 3 and 1. In a typical operation, the waste gases containing about 80% nitrogen, 3–5% n-butene, 2–5% carbon dioxide, and the balance being steam and oxygen, are advantageously recycled back through the catalyst bed. In each pass through the reactor, the medium residence time for the gas mixture in contact with the catalyst is preferably maintained at about 0.5 to 10, preferably 1 to 3 seconds. This residence time is based upon the gaseous stream of n-butene and oxygen and, if present, the inert gas.

The gaseous effluent from the reactor is cooled to condense water and acid therefrom. The acid mixture can then be worked up in a conventional manner, such as by distillation, to obtain acetic acid of high purity.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In the production of the catlyst, 456 g. of antimony trichloride are dissolved in 450 g. of water containing 120 g. of ammonium chloride (the ammonium chloride serving to buffer and prevent premature hydrolysis of the antimony trichloride), and 182 g. of canadium pentoxide, together with 145 g. of ethylamine are dissolved in 650 g. of water. These solutions are then continuously charged, in equivalent amounts and over a period of 10 minutes, into an agitated vessel containing 100 g. of ammonium chloride dissolved in 500 g. of water. At the same time, a sufficient amount of 3% aqueous ammonia solution is added to the vessel to maintain the pH of the resulting solution at 7. When the reaction commences, the reaction temperature rises to 45° C., whereupon the temperature is increased and maintained at 50° C. and the reaction continued while stirring for one hour. Thereafter, the mother liquor is separated, the precipitate is washed, dried, and heat-treated for 15 hours at 500° C. The precipitate is then comminuted and sieved to obtain a catalyst having a particle size of 0.1 to 0.3 mm. in diameter.

The catalyst thus obtained has the following characteristics:

Apparent density _____ 1.2
Atomic ratio of antimony/vanadium _____ 1:1.08

EXAMPLE 2

456 g. of antimony trichloride and 182 g. of canadium pentoxide are dissolved in 2 l. of a 18% hydrochloric acid solution. The resultant solution is then continuously added to an agitated reactor vessel containing 1 l. of water at 20° C., and there is simultaneously added a sufficient amount of a 10% ammonia solution to maintain the pH of the resulting solution at 7. The temperature of the resulting solution is then increased and maintained at 60° C. for one hour, while stirring. After filtering and washing the precipitate, there is obtained 360 g. of moist antimony vanadate. 120 g. of silicic acid, Aerosil 380, is mixed with the moist precipitate, the paste is dried and heat-treated at 500° C. for 15 hours, comminuted, and sieved.

There is thus obtained a catalyst of 0.1 to 0.3 mm. in diameter, having the following characteristics:

Apparent density _____ 0.73
Content of $SiO_2$ _____percent__ 24.8
Content of $V_2O_5$ _____do____ 34.7
Content of $Sb_2O_3$ _____do____ 40.5

EXAMPLE 3

To demonstrate the advantages of the present process, runs were made with the catalysts produced according to Examples 1 and 2. In each run, 150 ml. of the catalysts produced in Examples 1 and 2 are employed in a conventional fluidized bed reactor of quartz glass which is heated by a saline bath. Over a period of 4 hours, 600 l. of air, 40 l. of n-butene, and steam are passed through the reactor. The gases discharging from the reactor are cooled to condense water and acid which are then separated. The waste gas contains unreacted n-butene in addition to carbon oxides. The reaction conditions suitable for use with the individual catalysts and the corresponding butene conversion, and yields of reaction product are shown in Table I, attached hereto.

TABLE I.—CONVERSIONS AND YIELDS IN THE BUTENE OXIDATION

| Run | Catalyst of example | Steam charged over 4 hrs./l. | Steam temp.,° C. | Temperature of the saline bath,° C. | Conversion percent | Yields percent acetic acid | Propionic acid | Formic acid | Maleic acid | Formaldehyde | Carbon oxides, percent |
|---|---|---|---|---|---|---|---|---|---|---|---|
| 1 | 1 | 200 | 130 | 260 | 65 | 40 | 5 | 1.0 | 2 | 1.0 | 50 |
| 2 | 2 | 400 | 130 | 260 | 85 | 45 | 4 | 0.5 | 3 | 1.5 | 45 |
| 3 | 2 | 400 | 260 | 260 | 80 | 28.5 | 0 | 2 | 0 | 3.0 | 35 |
| 4 | (1) | 400 | 130 | 260 | 2 | | | | | | |

1 Antimony Vanadate catalyst used in DAS 1 181 194.

EXAMPLE 4

Using as the unsaturated hydrocarbon isobutylene, run 3 was conducted in the fluidized bed reactor, described in Example 3, which contained 150 ml. of the catalyst produced in Example 2. Over a period of 4 hours 600 l. of air, 40 l. of isobutylene, and 400 l. of steam at 280° C. are passed through the reactor. The gases discharging from the reactor are cooled to condense water and acid which are then separated. The waste gas contains unreacted isobutylene and carbon oxides, the reaction conditions and yields of reaction products being shown in Table I.

EXAMPLE 5

To compare the activity of the catalyst of the present invention with the prior art catalysts, run 4 was conducted according to Example 3 at 260° C. with the antimony vanadate catalyst used in DAS 1,181,194. The conversion of the n-butene charged was below 2 percent. By comparing the results of run 4 with those of runs 1 to 3, it can be seen that the antimony vanadate catalyst of the present invention exhibits markedly higher activity, particularly with respect to n-butenes. The catalyst used for run 4 was produced following the example of DAS 1,181,194 with respect of the parent DAS 1,177,628; it contained phosphorus oxide and gives the same results, containing bismuth oxides or not.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A process for the production of acetic acid by the catalytic gas-phase oxidation of butenes, which process comprises:
reacting an oxidizable gas mixture of butene with molecular oxygen at 250–400° C. in the presence of a precipitated antimony vanadate catalyst, said catalyst having been formed by dissolving a compound of vanadium and oxygen in a neutral to acidic aqueous solution containing antimony ions, wherein one of said metals has a valence of 5 and the other a valence of 3, and reacting said antimony ions with said vanadate ions at a substantially neutral or alkaline pH to form a precipitate.

2. Process as defined by claim 1 wherein the atomic ratio of antimony to vanadium in the catalyst is 1:3 to 2:1.

3. Process as defined by claim 1 wherein the atomic ratio of antimony to vanadium in the catalyst is 0.9:1 to 1:1.5.

4. Process as defined by claim 1 wherein said oxidizable mixture is in contact with the antimony vanadate catalyst for from about 0.5 to 10 seconds.

5. Process as defined by claim 1 wherein said oxidizable mixture is in contact with the antimony vanadate catalyst for from about 1 to 3 seconds.

6. Process as defined by claim 1 wherein said catalyst is deposited on an inert carrier therefor.

7. Process as defined by claim 1 wherein the reaction is conducted at 260–300° C.

8. Process as defined by claim 1 wherein the molar ratio of n-butene to oxygen is 1:1 to 1:20.

9. Process as defined by claim 1 wherein the reaction is conducted in the presence of steam.

10. Process as defined by claim 9 wherein the molar ratio of steam to n-butene is 1:5 to 1:15.

11. Process as defined by claim 1 wherein said n-butenes are reacted with air.

References Cited

Bretton et al., Ind. and Eng. Chem., 44, 594 (1952).
Distillers Co. Ltd., Britain 1,034,914, July 1966.

LORRAINE A. WEINBERGER, *Primary Examiner.*

D. STENZEL, *Assistant Examiner.*

U.S. Cl. X.R.

260—604